United States Patent [19]

Frame

[11] 4,081,179
[45] Mar. 28, 1978

[54] CIRCLE CUTTER

[76] Inventor: Ronald A. Frame, 816 W. Hartford Pl., Broken Arrow, Okla. 74012

[21] Appl. No.: 718,596

[22] Filed: Aug. 30, 1976

Related U.S. Application Data

[63] Continuation of Ser. No. 576,012, Aug. 8, 1975, Pat. No. 4,021,025.

[51] Int. Cl.² .............................................. B23K 7/10
[52] U.S. Cl. .................................................... 266/70
[58] Field of Search ...................... 266/58, 70, 71, 77; 33/27 R, 27 K; 148/9 R; 308/72, 73, 183, 184 A

[56] References Cited

U.S. PATENT DOCUMENTS

| 737,477 | 8/1903 | Radebaugh | 308/183 X |
| 2,269,505 | 1/1942 | Anderson | 266/70 |
| 3,417,979 | 12/1968 | Cable et al. | 266/71 X |

*Primary Examiner*—Roy Lake
*Assistant Examiner*—Paul A. Bell
*Attorney, Agent, or Firm*—Head, Johnson & Chafin

[57] ABSTRACT

A circle cutting apparatus particularly adaptable for the cutting of circles and arcs in metal plates and the like with a cutting torch. The device comprises a circular platform which is attached to the plate to be cut and a torch or cutting implement which is radially adjustable with respect to the platform, the cutting apparatus being also movable in a circular path with respect to the platform.

1 Claim, 4 Drawing Figures

CIRCLE CUTTER

This is a continuation of application Ser. No. 576,012 filed May 8, 1975, now U.S. Ser. No. 4,021,025.

BACKGROUND OF THE INVENTION

1. Field of the Invention

The present invention relates to circle cutting apparatus and more particularly, but not by way of limitation, to a cutting apparatus which supports a cutting torch for accurately cutting circles in metal plates or the like.

2. Description of the Prior Art

In many cases in the construction of boiler rooms and any place where metal pipe is routed and used, it is often necessary to cut accurate holes in a metal plate or to construct flanges for the pipes. It is further often desirable to be able to cut that hole in such a way as to leave a bevel for facilitating more effective welding of the pipe for fitting to the plate. Many times the welder who is faced with this problem will take great pains and spend a great amount of time attempting to draw a circle on the plate to be cut and then, by hand holding the torch, attempting to follow that circle to make his cut. These cuts invariably result in a hole that is not accurately cut and often with a bevel which is not at all uniform.

There are some hole cutting apparatuses on the market which are rather elaborate and expensive. Normally these devices would be beyond the cost range of most individual welders. Further, these items presently on the market are seldom portable and adaptable for setting directly on a plate which is flat for a cutting surface. However, in actual operation or use, it is often necessary to cut a hole in a plate which is vertically mounted or sometimes mounted overhead. Therefore, when portability is required, the present day apparatus for making circular cuts are substantially unuseable.

SUMMARY OF THE INVENTION

The present invention is particularly designed and constructed for overcoming the above disadvantages. The present invention provides a circular platform having a circular track attached thereto. This platform is provided with a plurality of outwardly extending leg members, each of which are provided with a very strong permanent magnet. The lifting capacity of the plurality of the magnets is far in excess of total weight of the cutting apparatus so that the cutting apparatus may be attached to a metal plate at substantially any angle including an overhead angle for making a cut.

A moveable arcuate shaped track follower member is secured to the track with a plurality of bearings being interposed there between to assure that track follower is centered with respect to the track.

Attached to this track follower is a bracket for slidably supporting an elongated bar which is graduated for measurements. A cutting torch apparatus is pivotedly securable to either end of the elongated bar and is provided with at least 45° of pivotal freedom for the purpose of cutting bevels in the plate. When it is desired to cut circles having a diameter larger than the platform, the cutting torch is secured to one end of the elongated bar and moveable radially outwardly for substantially the entire length of the bar.

On the other hand, when it is desirable to cut a circle having a radius smaller than that of the platform, the cutting torch may be removed and placed at the opposite end of the bar inside the boundaries of the platform for making a circular cut therein. This is accomplished without having to remove the elongated bar from its sliding bracket means.

The apparatus is further provided with a second bracket which is secured to the track follower and is radially adjustable with respect thereto. An electric drive motor is secured to the bracket means. A gear box is secured to the output of the electrical drive motor with the output of the gear box constituting a rotating shaft having at least one friction drive wheel attached thereto. The friction drive wheel is brought into frictional contact with a circular portion of the platform for moving the track follower around the track with respect to the platform.

The drive motor is a variable speed motor since often with thicker plates it is a requirement to move the cutting torch more slowly than with a thin plate. For further course speed adjustment, the output shaft of the gear box is provided with a pair of frictional drive wheels having different diameters. When it is necessary to change the drive to a different diameter, the drive wheel assembly is simply inverted and the movable bracket is adjusted to bring the second wheel in frictional contact with the platform.

DESCRIPTION OF THE DRAWINGS

Other and further advantageous features of the present invention will hereinafter fully appear in connection with a detailed description of the drawings in which.

DESCRIPTION OF THE PREFERRED EMBODIMENT

Figure 1:
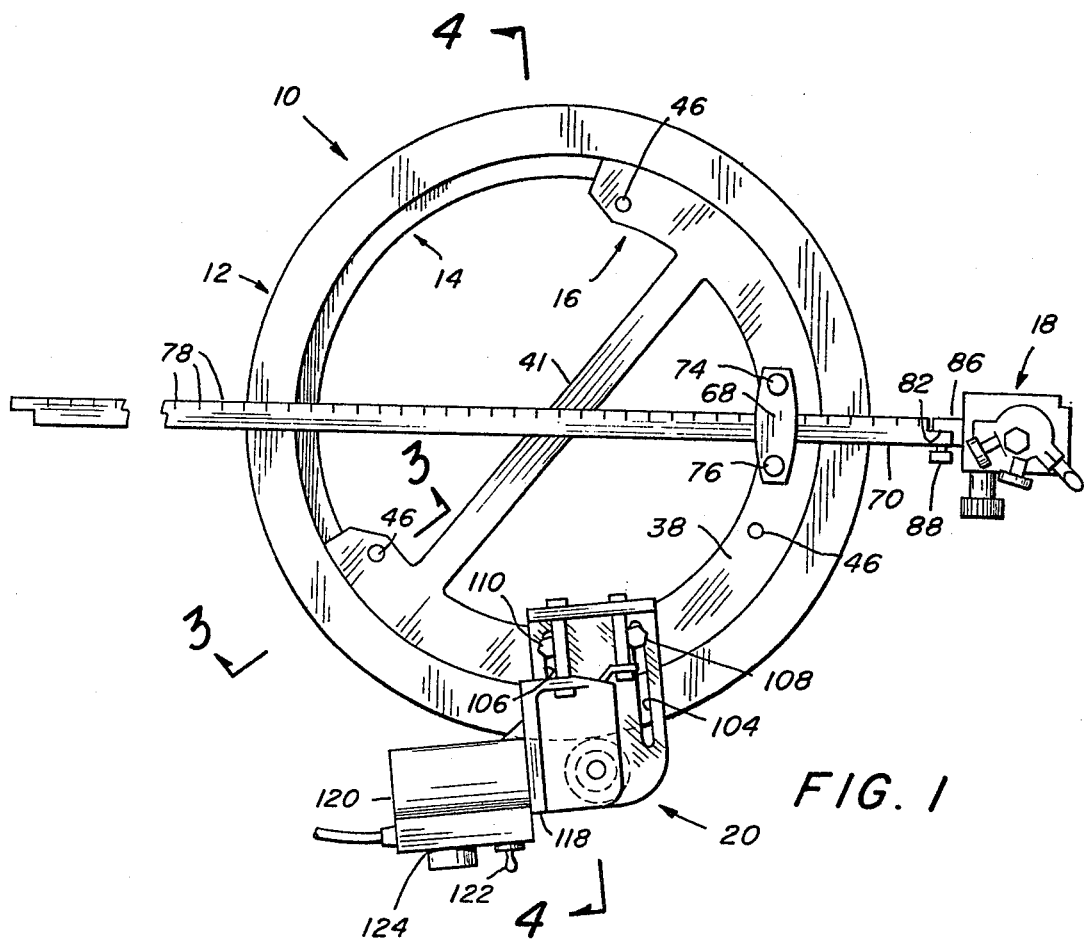
FIG. 1 is a plan view of circle cutting apparatus embodying the present invention.

Referring to the drawings in detail, reference character 10 generally indicates a circle cutting apparatus comprising a platform 12 having track means 14 therearound, and track follower means 16 movably connected to the track means 14. Cutting means 18 is movably attached to the track follower means 16 and is radially movable with respect to said track follower means 16. Drive means generally indicated by reference character 20 is likewise secured to the track follower means 16 and operably connected to the platform 12 for moving said track follower 16 and associated cutting means 18 in a circular path with respect to the platform 12.

Figure 2:
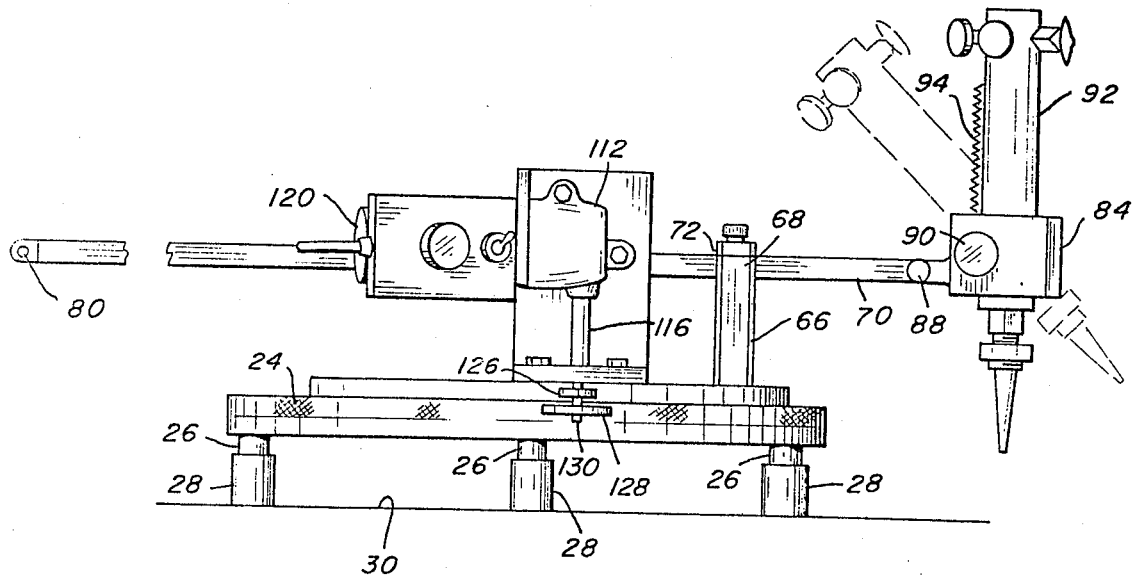
FIG. 2 is a front elevational view of the apparatus of FIG. 1.

The platform 12 comprises an annular ring member 22, with at least a portion of the outer surface thereof being provided with scoring 24, for a purpose that will be hereinafter set forth. One side of the platform 12 is provided with a plurality of downwardly extending leg members 26, each said leg member being provided at the outer end thereof with a permanent magnet 28 for attachment to a metal plate or the like to be cut which is generally shown in FIG. 2 at 30. It is noted that the sum total of the lifting power of the magnets 28 must be well in excess of the entire weight of the apparatus so that the apparatus could conceivably be attached directly to an overhead plate for making circular cuts in a manner that will be hereinafter set forth.

Figure 3:
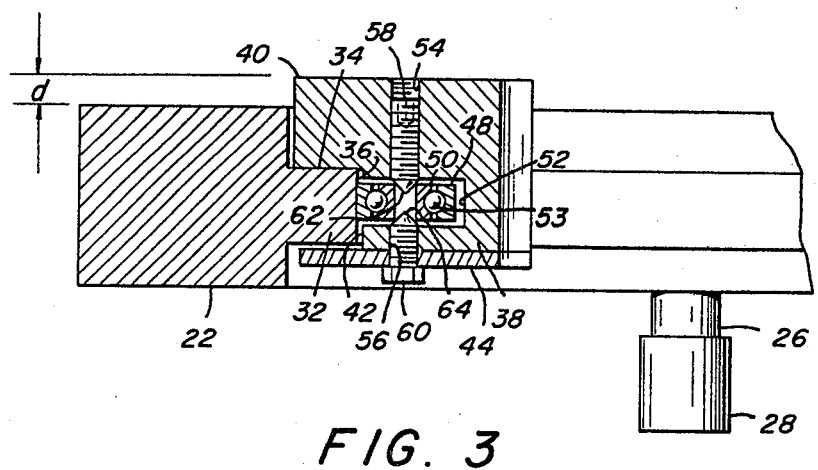
FIG. 3 is a sectional view depicting the centering bearings interposed between the track and track follower and taken along the broken lines 3—3 of FIG. 1.
Figure 4:
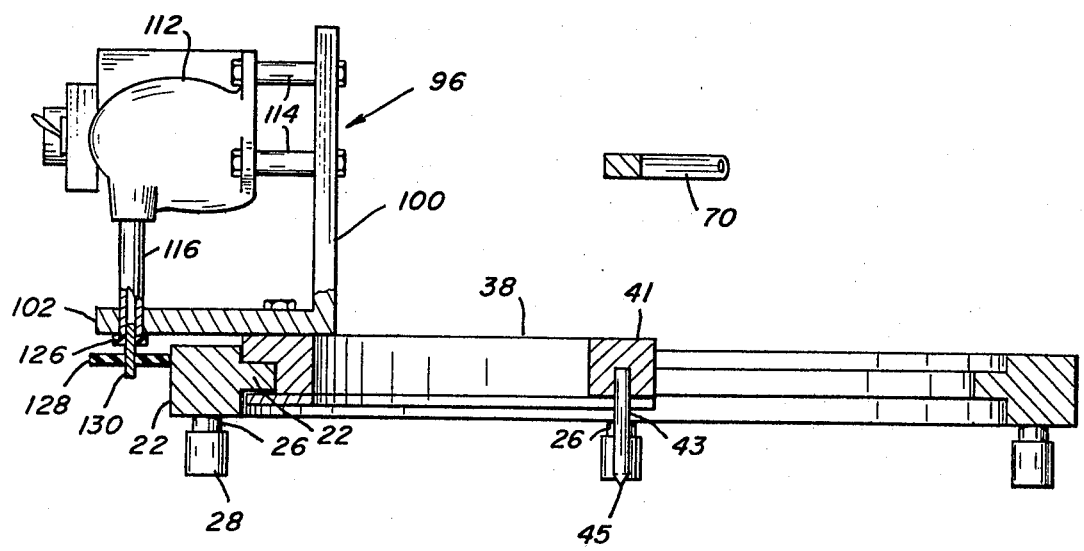
FIG. 4 is a partial sectional view of the apparatus of FIG. 1 taken along the broken line 4—4 of FIG. 1.

The circular track means 14 comprises an annular ring 32 which is secured to the inside surface of the annular ring member 22 of the platform 12, the track ring 32 constituting a circular inwardly extending tongue member of the platform ring 22 and can be made as an integral part thereof as shown in FIGS. 3 and 4. It is necessary that the top surface 34 of the track ring 32 be machined substantially smooth and at substantially right angles to the inner surface 36 thereof for a purpose that will be hereinafter set forth.

The track follower means 16 comprises an arcuate member 38 which subtends an arc greater than 180° and which is provided with an outwardly extending flange portion 40 around the outer surface thereof. The lower portion of the flange member 40 is positioned in sliding contact with the upper surface 34 of the track ring 32. The flange member 40 is made as an integral part of the arcuate member 38 with the outer surface 42 of the arcuate member 38 being of a radius just smaller than the inside surface of the track ring 32. The upper surface of the flange portion 40 of the arcuate member 38 extends upwardly above the top surface of the platform ring 22 by a distance $d$. The bottom surface of the arcuate ring 38 is provided with a similarly shaped arcuate plate 44 which is rigidly secured thereto after the member 38 is put in place on the platform 12.

The track follower 16 is provided with a crossbar 41 which is attached diametrically across the arcuate member 38 and which serves a twofold purpose, the first being to stiffen or strengthen the arcuate member 38. Referring now to FIG. 4, reference character 43 depicts an elongated downwardly extending pin member, having a pointed tip at 45 with the upper end being secured to the crossbar 41. The pin 43 is located in the geometric center of the cutting apparatus with point 45 being utilized as a center finder for the circle to be cut.

The arcuate member 38 is further provided with a plurality of bearing members 46 which are primarily for the purpose of centering the arcuate member 38 with respect to the track ring 32. Each bearing member 46 generally comprises an outer race 48, an inner race 50 and a plurality of ball bearings 53 therein. The bearings may be off-the-shelf purchased items of unitary construction. The outer surface of the track follower 38 is provided with a plurality of recesses 52 for housing the bearings 46. The track follower 38 is further provided with a pair of aligned threaded bores 54 and 56 in communication with the bearing recesses 52. The bores 54 and 56 are provided with associated threaded set screws 58 and 60, respectively, each said set screw having a pointed end 62 and 64, respectively.

Upon installation, the track follower 38 is positioned on track means 32 with the flange 40 being in contact with the track surface 34 as heretofore set forth. The bearing members 46 are loosely positioned in their recesses 52. The set screws 58 and 60 are then operated inwardly until contact is made with the inner race 52 of the bearing 46. Upon tightening of the set screws 58 and 60, the pointed ends 62 and 64 thereof will cause the bearings to center with the holes, the bores, 54 and 56 which have been sized and positioned in a manner to force the outer race 48 of the bearing over and against the inside surface 36 of the track means 32.

This mechanism will serve not only to center the arcuate track follower with respect to the track but will serve to maintain this relative position regardless of the orientation of the cutting apparatus. The lower retaining plate 44 will further insure that the track follower and associated equipment will remain in place with respect to the platform when the cutter is being used in a vertical mode of operation or some other orientation.

A first vertically disposed bracket means 66 is secured at the bottom thereof to the arcuate track follower 16 and extends upwardly therefrom. Centered in the upper portion thereof is a downwardly extending recess 68 for slidable receiving an elongated radial arm bar 70 therein. The groove or recess 68 is in axial alignment with respect to the center of the cutting apparatus whereby the bar 70 will extend over the center of the apparatus. The cross sectional shape of the recess 68 may be of substantially any configuration so long as it conforms with the cross sectional shape of the bar 70. An upper clamping plate 72 is attachable to the upper end of the bracket 66 by a means of a pair of threaded screws 74 and 76 for tightening and securing the elongated bar in a desired position.

The elongated bar 70 is provided with a plurality of spaced indicia marks 78 which are keyed to one surface of the clamping plate or cap plate 72 of the bracket 66 for a purpose that will hereinafter be set forth. Each end of the elongated bar 70 is also provided with oppositely disposed rounded end with bores 80 and 82 therethrough.

A torch bracket 84 having a rearwardly extending attachment arm 86 is pivotedly secured to one end of the elongated bar 70 by means of a tightenable pivot pin 88. Bracket 84 is provided with a pinion gear and associated operator knob 90. The bracket 84 is adapted to receive a vertically disposed cutting torch 92 slidably therein. The torch 92 is provided with a rack gear 94 along one side thereof so that when the torch 92 is disposed within the bracket 84 the rack gear 94 is in meshing engagement with the pinion gear 90 for reciprocal movement of the torch with respect to the bracket 84. Referring to FIG. 2, it is readily seen that the bracket 94 may be pivoted about the pin 88 to substantially 45° angle in either direction for the purpose of making a bevel cut in the plate 30.

A second bracket means 96 comprising a vertical member 100 and a horizontal member 102 at right angle thereto is adjustably attached to the arcuate member 38 of the track follower 16. The base member 102 of the bracket 96 is provided with a pair of spaced, elongated slots 104 and 106 for receiving the bolts 108 and 110 respectively therethrough, the slots being so aligned that the bracket 96 may be adjusted radially with respect to the geometric center of the cutting apparatus. A gear reducing mechanism 112 is secured to the bracket member 100 by means of the bolt 114 and is provided with a rotating output shaft 116 extending downwardly therefrom. The gear reduction mechanism 112 is further provided with a motor mounting plate 118 for attaching an electrical motor 120 thereto. The output of the motor 120 serves as a rotating drive for the gear reducer 112. The motor 120 is provided with an on-off reverse switch 122 and a variable transformer control means 124 whereby the speed of the motor may be adjusted in either a forward or reverse mode of operation.

The lower end of the output shaft 116 of the gear reducer 112 is provided with a pair of friction drive wheels 126 and 128 which are attached to a shaft member 130. Shaft member 130 is secured to the lower end of the operator shaft 116 which extends through the base member 102 of bracket 196. As shown in FIG. 4, the larger friction drive wheel 128 is placed in frictional contact with the outer scored surface 24 of the platform member 22. The force of the wheel 128 against the surface 24 is adjusted by means of the slots 104 and 106 and associated bolts 108 and 110. If further gear reduction is required, the shaft 130 may be inverted thereby placing the smaller frictional wheel 126 in contact with the outer surface of the platform member 22 with the larger wheel 128 being allowed to recess back into the space between the base member 102 with bracket 96 and the upper edge of the platform member 22. It is therefore required that the thickness of the wheel 128 be no larger than the distance $d$, which is depicted in FIG. 3.

In operation, when it is desirable to cut a circle in a metal plate or the like, a small bore or drill should be made to mark the desired center of the circle for receiving the circle finder 45 therein. It is noted, however, that it is not absolutely necessary to drill the center point since the magnetic leg members 28 would be sufficient to hold the cutting apparatus 10 in place during the cutting operation. After the machine has been positioned with respect to the plate, the screws 74 and 76 of the bracket 66 are then loosened to allow radial adjustment of the arm 70. Naturally, the use of the graduated marks on the bar in making this radial adjustment will depend on the angle of the torch 92 with respect to the plate 30. The torch may be raised and lowered with respect to the surface to be cut by means of the rack and pinion gears 94 and 90. When the torch has been accurately positioned, the torch may be ignited along with the starting of the drive motor 120. The drive motor 120 will, through the gear reducer 112 drive the friction wheel, either 126 or 128 around he outer surface of the platform member 22 which will in turn move the entire track follower 16 and associated cutting torch 92 around the platform thereby allowing the cutting torch to cut an accurate circle in the plate 30.

From the foregoing, it is apparent that the present invention provides a circle cutting apparatus which is particularly adaptable for use with the cutting torch in cutting circles for flanges from metal plates 30. The magnetic legs attachment means allows the mechanism to be oriented to any particular metal plate, whether it be overhead or on the floor. It is further noted that the magnetic legs members 28 could be replaced by a bolt attachment or the like where material which is nonmagnetic is being cut.

It is further noted that if it is desired to cut a circle which has a radius or diameter less than that of the track means 14, the torch mechanism 92 and associated bracket 84 is simply removed from the bore 82 and attached to the opposite end of the rod or bar 70 to hole 80. The bar may then be adjusted to move the torch mechanism 90 to the space within the platform member 22 within the track 14 thereof.

Therefore, it is apparent that substantially any size circle may be cut within the limitations of the bar 70 except that small portion which lies between the track 14 and the outer surface of the platform 22.

Whereas, the present invention has been described in particular relation to the drawings attached hereto, it is obvious that other and further modifications apart from those shown or suggested herein may be made within the scope of the invention.

I claim:

1. A circle cutting apparatus for cutting circles and metal plates comprising;
   a platform having a circular track means secured thereto, means for attaching the platform to the plate to be cut, track follower means comprising an arcuate member subtending greater than 180° movably attachable to the track means and capable of being moved completely around said track means, a cutting apparatus secured to the track follower means and operably engaged with the plate to be cut, a drive means operably connected between the circular track means and the track follower means for moving said track follower means around the circular track means, the circular track means comprising an inwardly extending flange secured to the platform, and including three horizontally disposed bearing means having axis of rotation parallel to the axis of the circular track means, said bearing means being interposed between the track follower means and the circular track means and being radially spaced through an angle greater than 180° to provide a three point suspension, centering means operably connected to the bearing means for radially adjusting the position of the bearing means for centering the track follower means with respect to the circular track means and including bearing positioning means operably connected to the bearing means for adjusting the position of said bearing means longitudinally with respect to its axis of rotation and wherein the centering means and bearing positioning means comprises a central bore through each bearing means axis of rotation, a recess for each bearing means provided in the track follower means for receiving said bearing means therein, a pair of aligned threaded bores on each side of the recess means, said threaded bores being larger than the bearing means bore and being positioned with respect to the edge of the track follower means such that when the track follower means is engaged with the circular track means, the mean distance between the axis of each of said threaded bores and the circular track means is substantially equal to the radius of the bearing means, a pair of oppositely disposed threaded screw members in each of said aligned bores, each pair of said screw members having inwardly directed tapered ends engageable with the bearing means bore for forcing said bearing means to center with respect to the screw members thereby forcing the outer edge of each bearing means outwardly against the circular track means and further being capable of adjusting the position of the bearing means longitudinally along its axis of rotation.

* * * * *